United States Patent
Voo et al.

(10) Patent No.: US 8,982,489 B1
(45) Date of Patent: Mar. 17, 2015

(54) PSEUDO-DIFFERENTIAL MAGNETIC RECORDING SYSTEM AND METHOD INCORPORATING A DUMMY READ ELEMENT AND A DUMMY TRANSMISSION LINE

(71) Applicant: Marvell World Trade Ltd., St. Michael (BB)

(72) Inventors: Thart Fah Voo, Singapore (SG); Sang Kong Chan, Singapore (SG); Ah Siah Chua, Singapore (SG); Xiao Yu Miao, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/501,229

(22) Filed: Sep. 30, 2014

Related U.S. Application Data (60) Provisional application No. 61/888,291, filed on Oct. 8, 2013.

(51) Int. Cl.
 *G11B 5/09* (2006.01)
 *G11B 5/17* (2006.01)
(52) U.S. Cl.
 CPC ... *G11B 5/17* (2013.01); *G11B 5/09* (2013.01)
 USPC .............................................. 360/46; 360/67

(58) Field of Classification Search
 USPC ............ 360/46, 67, 61, 22, 32, 48, 70, 78.12, 360/246; 370/342, 335, 347; 369/44.32, 369/44.27, 47.14, 53.35
 See application file for complete search history.

(56) References Cited

U.S. PATENT DOCUMENTS

| | | | | |
|---|---|---|---|---|
| 5,293,278 | A | * | 3/1994 | Pahr ................................. 360/67 |
| 8,031,565 | B2 | * | 10/2011 | Isshiki ......................... 369/44.32 |

* cited by examiner

*Primary Examiner* — Ali Neyzari (57) ABSTRACT

A system including a first transmission line, a second transmission line, a first element, a second element and a differential amplifier. The first element is configured to read a storage media to generate a read signal, where the first element is connected to the first transmission line. The second element is configured to detect interference and generate an interference signal, where the second element is connected to the second transmission line. The differential amplifier includes a first input and a second input, where the first input of the differential amplifier is connected to a the first transmission line and receives the read signal, and where the second input of the differential amplifier is connected to the second transmission line and receives the interference signal.

20 Claims, 7 Drawing Sheets

PSEUDO-DIFFERENTIAL MAGNETIC RECORDING SYSTEM AND METHOD INCORPORATING A DUMMY READ ELEMENT AND A DUMMY TRANSMISSION LINE

CROSS-REFERENCE TO RELATED APPLICATIONS

This application claims the benefit of U.S. Provisional Application No. 61/888,291, filed on Oct. 8, 2013. The entire disclosure of the application referenced above is incorporated herein by reference.

FIELD

The present disclosure relates to magnetic recording systems with trace suspension assemblies.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
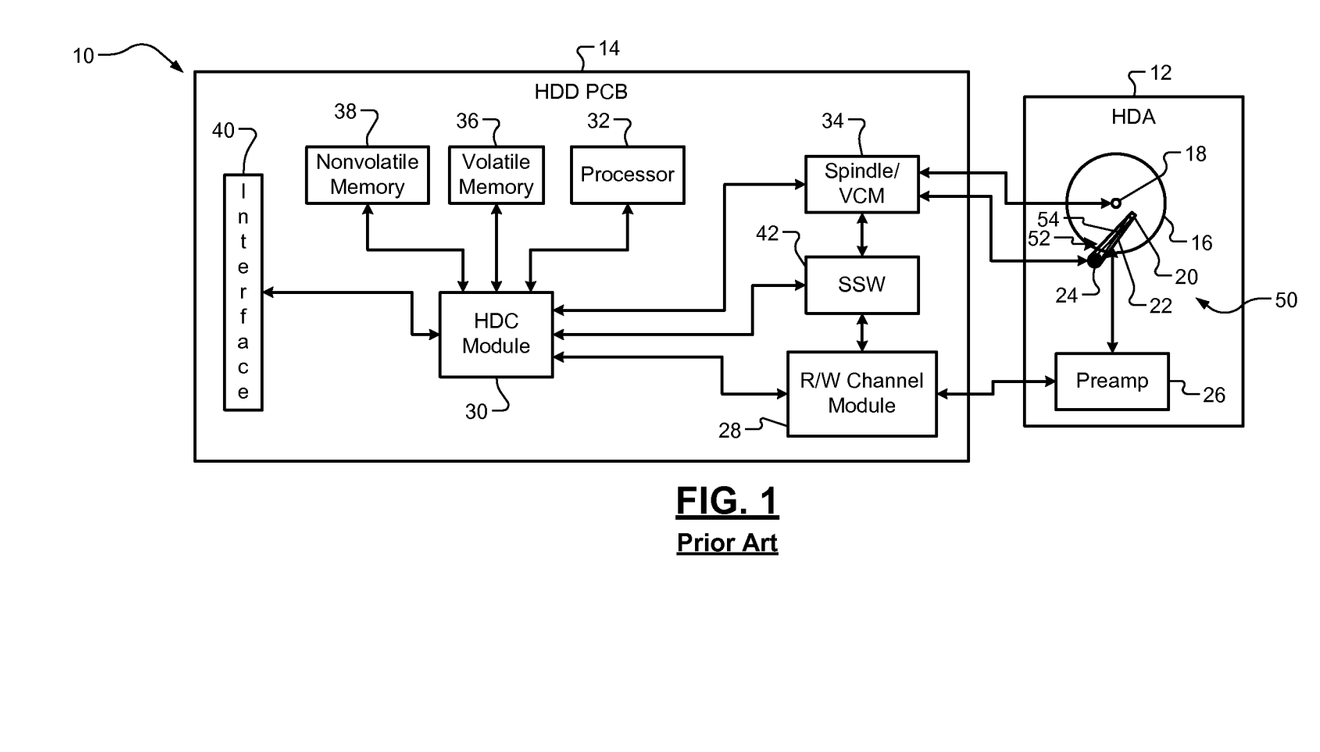
FIG. 1 is a functional block diagram of a hard disk drive according to the prior art.

FIG. 1 shows a hard disk drive (HDD) 10 that includes a hard disk assembly (HDA) 12 and a HDD printed circuit board (PCB) 14. The HDA 12 includes one or more platters 16, which have magnetic surfaces that are used to store data magnetically. Data is stored in binary form as a magnetic field of either positive or negative polarity. The platters 16 are arranged in a stack. The platters 16 and/or the stack is rotated by one or more spindle motors (one spindle motor 18 is shown). One or more read/write heads (hereinafter, "heads") read data from and write data on the magnetic surfaces of the platters 16. A single head 20 is shown. Each of the heads includes a write element (e.g., an inductor) that generates a magnetic field and a read element (e.g., a magneto-resistive (MR) element), which senses the magnetic field on one of the platters 16. The heads are mounted at a distal end of one or more actuator arms (a single actuator arm 22 is shown). An actuator, such as a voice coil motor (VCM) 24, moves the actuator arm 22 relative to the platters 16.

The HDA 12 includes a preamplifier device 26. The preamplifier device 26 may include amplifiers for amplifying signals received from the heads. When reading data, generated magnetic fields induce low-level analog signals in the read elements of the head 20. The amplifiers amplify the low-level analog signals and output amplified analog signals to a read/write (R/W) channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the data previously stored on the platters 16.

The HDC module 30 controls operation of the HDD 10. For example, the HDC module 30 generates commands that control the speeds of the one or more spindle motors and the movement of the one or more actuator arms. The spindle/VCM driver module 34 implements the commands and generates control signals that control the speeds of the one or more spindle motors and the positioning of the one or more actuator arms. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads over the platters 16 during read/write operations. Servo, which is stored on the platters 16, ensures that data is written to and read from correct locations on the platters 16. In some implementations, a self-servo write (SSW) module 42 may write servo on the platters 16 using the heads prior to storing data on the HDD 10.

The HDA 12 may include a two-dimensional magnetic recording (TDMR) system 50 and/or other system having a trace suspension assembly (TSA) 52 and multiple read elements. The TSA 52 refers to the one or more actuator arms and transmission lines (e.g., transmission lines 54 are shown) extending between the preamplifier device 26 and the heads. The transmission lines (sometimes referred to as traces) are suspended over the platters 16 via the one or more actuator arms. A TDMR system, such as the TDMR system 50, uses multiple heads positioned adjacent each other to read a single track on a surface of a platter. Signals from the heads are processed to counteract, cancel and/or minimize noise (e.g., inter-track noise and backplane noise coupling) detected during the reading of the track. Inter-track noise can refer to magnetic field characteristics detected and associated with one or more tracks adjacent to the track being read. Backplane noise coupling can refer to noise coupling associated with parallel connected transmission lines, where each of the parallel connected transmission lines is connected to a common ground. Reducing noise improves signal-to-noise ratios for improved recovery of data stored on the tracks.

Figure 2:
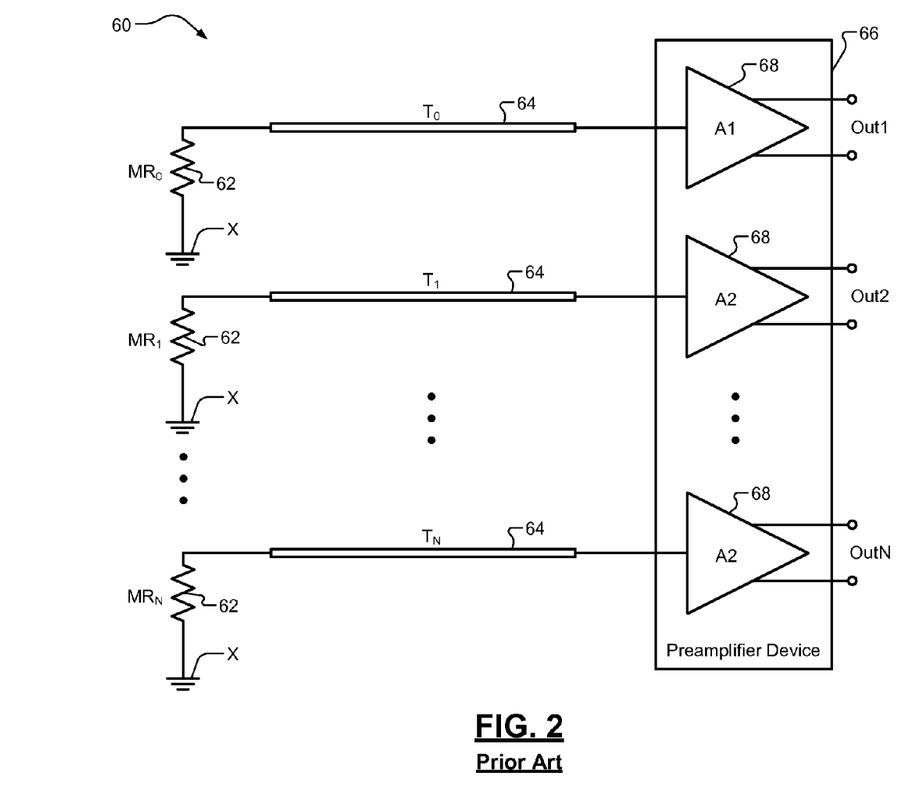
FIG. 2 is a functional block diagram of a magnetic recording system incorporating a single transmission line per differential amplifier according to the prior art.

FIG. 2 shows a magnetic recording system 60 that may be used in the HDA 12 of FIG. 1. The magnetic recording system 60 may be a TDMR system and includes read elements 62, transmission lines 64, and a preamplifier device 66. The preamplifier device 66 includes differential amplifiers 68. Each of the read elements 62 is connected to a respective one of the differential amplifiers 68 via a respective one of the transmission lines 64. The differential amplifiers 68 receive single-ended signals from the transmission lines 64, convert the single-ended signals to differential output signals Out1-OutN, and output the differential output signals Out1-OutN, as shown. Gain of each of the differential amplifiers 68 may be adjusted to increase amplitudes of the differential output signals Out1-OutN and/or to improve corresponding signal-to-noise ratios.

Figure 3:
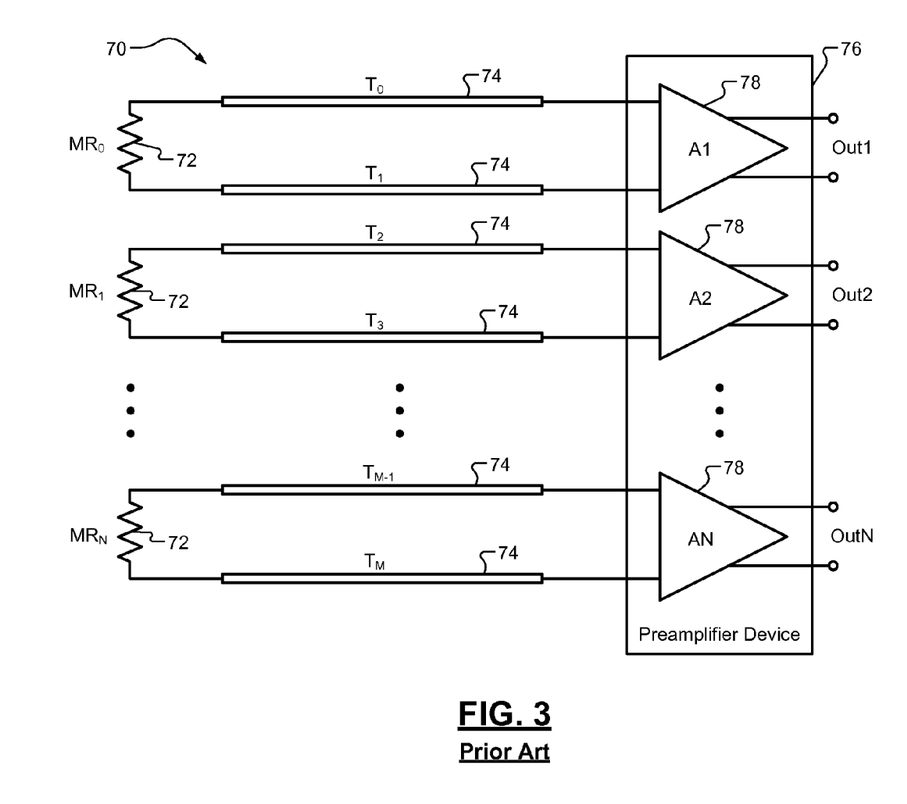
FIG. 3 is a functional block diagram of a fully differential magnetic recording system according to the prior art.

As read cycle frequencies increase, noise picked-up by the read elements 62 can increase, which can negatively affect the signal-to-noise ratios. To minimize and/or cancel the noise, a fully differential magnetic recording system may be used instead of the magnetic recording system 60. A fully differential magnetic recording system provides improved common mode noise rejection by providing differential signals from read elements to differential amplifiers. Common mode noise rejection refers to cancellation of noise common to both inputs of a differential amplifier. FIG. 3 shows an example of a fully differential magnetic recording system 70 that may be used in the HDA 12 of FIG. 1.

The magnetic recording system 70 includes read elements 72, transmission lines 74, and a preamplifier device 76. The preamplifier device 76 includes differential amplifiers 78. Each of the read elements 72 is connected to a respective one of the differential amplifiers 78 via a respective pair of the transmission lines 74. The read elements 72 provide differential signals to inputs of the differential amplifiers 78. Noise signals received at the inputs of each of the differential amplifiers 78 may be compared and cancelled by the corresponding one of the differential amplifiers 78. The differential amplifiers 78 provide differential output signals Out1, Out2. Gain of each of the differential amplifiers 78 may be adjusted to increase amplitudes of the output signals Out1, Out2 and/or to improve corresponding signal-to-noise ratios.

SUMMARY

A system is provided and includes a first transmission line, a second transmission line, a first element, a second element and a differential amplifier. The first element is configured to read a storage media to generate a read signal, where the first element is connected to the first transmission line. The second element is configured to detect interference and generate an interference signal, where the second element is connected to the second transmission line. The differential amplifier includes a first input and a second input, where the first input of the differential amplifier is connected to a the first transmission line and receives the read signal, and where the second input of the differential amplifier is connected to the second transmission line and receives the interference signal.

In other features, the second element is not configured to read data or information from a track. In other features, the system includes multiple transmission lines including the first transmission line and not the second transmission line. The read signal is a first read signal. The system further includes elements and differential amplifiers. The elements include the first element, where the elements are configured to read one or more tracks on the storage media to generate read signals. The read signals include the first read signal. Each of the elements is connected to a respective one of the transmission lines. The differential amplifier is a first differential amplifier. The differential amplifiers include the first differential amplifier, where the differential amplifiers are connected respectively to the plurality of elements via the transmission lines, and where the differential amplifiers include respective first inputs and respective second inputs. Each of the first inputs of the differential amplifiers is connected to a respective one of the transmission lines and receives a respective one of the read signals. Each of the second inputs of the differential amplifiers is connected to the second transmission line and receives the interference signal.

In other features, the differential amplifiers are configured to amplify differential input signals. Each of the differential input signals is based on one of the read signals and the interference signal.

In other features, the transmission lines include the first transmission line and a third transmission line. The elements include the first element and a third element. The differential amplifiers include the first differential amplifier and a second differential amplifier. The first element is connected between a ground reference and the first transmission line. The second element is connected between the ground reference and the second transmission line. The third element is connected between the ground reference and the third transmission line. The first transmission line is connected between the first element and the first input of the first differential amplifier. The second transmission line is connected between the second element and each of the second inputs of the differential amplifiers. The third transmission line is connected between the third element and the first input of the second differential amplifier.

In other features, the system includes a capacitance connected in series with the second transmission line and between the second transmission line and the second inputs of the differential amplifiers. In other features, the system includes a capacitance connected between the second transmission line and the second inputs of the differential amplifiers.

In other features, a system is provided that includes transmission lines, elements, a second element, and differential amplifiers. The elements are configured to read one or more tracks on a storage media to generate read signals, where each of the elements is connected to a respective one of the transmission lines. The second element is configured to detect interference and generate an interference signal, where the second element is connected to a dummy transmission line. The differential amplifiers are connected respectively to the elements via the transmission lines, where each of the differential amplifiers includes a first input and a second input, and where each of the first inputs of the differential amplifiers is connected to a respective one of the transmission lines and receives a respective one of the read signals. Each of the second inputs of the differential amplifiers is connected to the dummy transmission line and receives the interference signal.

In other features, a method is provided and includes: reading a track on a disk to generate a read signal via a first element, where the first element is connected to a first transmission line; detecting interference and generating an interference signal via a second element, where the second element is connected to a second transmission line; receiving the read signal at a first input of a differential amplifier; and receiving the interference signal at a second input of the differential amplifier. The first input of the differential amplifier is connected to the first transmission line. The second input of the differential amplifier is connected to the second transmission line. In other features, the transmission lines include the first transmission line and not the second transmission line. The track is a first track. The read signal is a first read signal. The differential amplifier is a first differential amplifier.

In other features, the method further includes reading one or more tracks on the disk to generate read signals via elements, where the read signals include the first read signal, where the elements include the first element, and where each of the elements is connected to a respective one of the transmission lines. The method further includes receiving the read signals respectively at differential amplifiers, where the differential amplifiers include the first differential amplifier and are connected respectively to the elements via the transmission lines. The differential amplifiers include respective first inputs and respective second inputs. The first inputs receive respectively the read signals. The method further includes receiving the interference signal at each of the second inputs of the differential amplifiers, where each of the second inputs is connected to the second transmission line.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Although a fully differential magnetic recording system, as shown in FIG. 3, minimizes noise and improves signal-to-noise ratios, a corresponding actuator arm can be congested. This is because a fully differential magnetic recording system includes a pair of transmission lines for each read element and corresponding differential amplifier. The more read elements associated with an actuator arm the more transmission lines extending across the actuator arm. Thus, a large number of transmission lines can be extended across an actuator arm of a fully differential magnetic recording system.

The following disclosed implementations include pseudo-differential magnetic recording systems. These systems have fewer transmission lines than a fully differential magnetic recording system and provide noise reduction and/or cancellation similar to a magnetic recording system having a single transmission line per differential amplifier (e.g., the magnetic recording system of FIG. 2).

Figure 4:
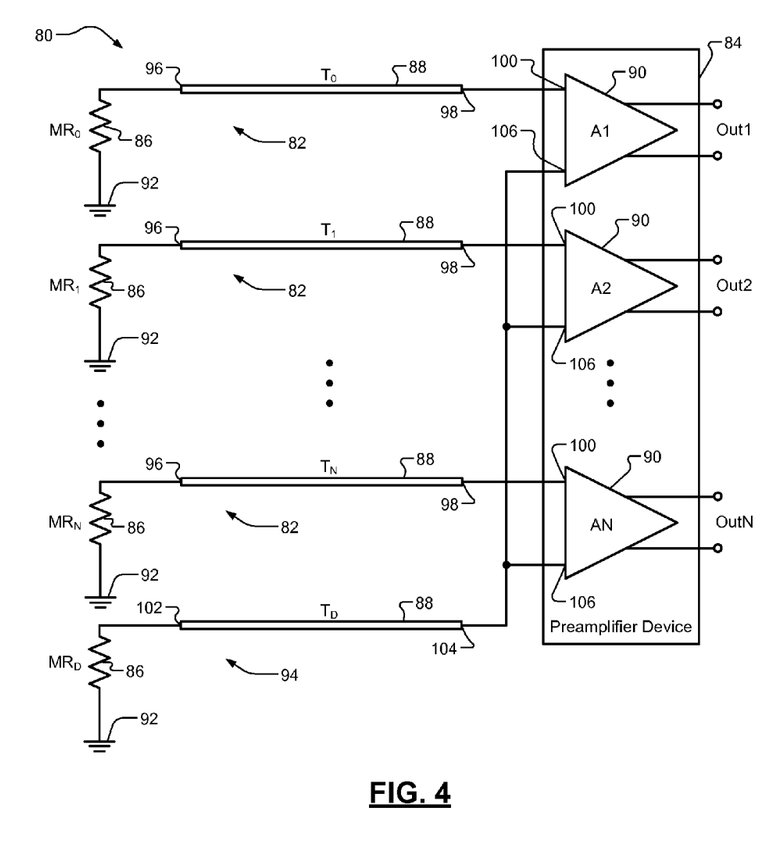
FIG. 4 is a functional block diagram of a pseudo-differential magnetic recording system according to an embodiment of the present disclosure.

FIG. 4 shows a pseudo-differential magnetic recording system 80 that may be used in the HDA 12 of FIG. 1. The pseudo-differential magnetic recording system 80 may be a TDMR system and includes read circuits 82 and a preamplifier device 84. The read circuits 82 include read elements 86 and transmission lines 88. The preamplifier device 84 includes differential amplifiers 90. Each of the read elements 86 is connected to a respective one of the differential amplifiers 90 via a respective one of the transmission lines 88. The read elements 86 include active read elements $MR_0$-$MR_N$ and a dummy (or floating) read element $MR_D$. An active read element refers to a read element that is used to read data and/or information from a track. A dummy read element refers to a read element that is not used to read data and/or information from a track, but rather is used for interference (including noise) cancellation purposes. The dummy read element $MR_D$ may have a same resistance and/or impedance as each of the active read elements $MR_0$-$MR_N$. Each of the read elements $MR_0$-$MR_N$ and $MR_D$ may be connected between a ground reference 92 and a respective one of the transmission lines 88.

The transmission lines 88 include transmission lines $T_0$-$T_N$ and a dummy transmission line $T_D$. A dummy circuit 94 includes the dummy read element $MR_D$ and the dummy transmission line $T_D$. First ends 96 of the transmission lines $T_0$-$T_N$ are connected respectively to the active read elements $MR_0$-$MR_N$. Second ends 98 of the transmission lines $T_0$-$T_N$ are connected to respective first inputs 100 of the differential amplifiers 90. A first end 102 of the dummy transmission line $T_D$ is connected to the dummy read element $MR_D$. If the dummy transmission line $T_D$ is DC coupled, a second end 104 of the dummy transmission line $T_D$ is connected to second inputs 106 of the differential amplifiers 90. The dummy transmission line $T_D$ may have a same impedance as each of the transmission lines $T_0$-$T_N$. A collective impedance of the dummy read element $MR_D$ and the dummy transmission line $T_D$ may be a same impedance as a collective impedance of each of the read elements $MR_0$-$MR_N$ and a corresponding one of the transmission lines $T_0$-$T_N$. Impedances of the dummy circuit 94 as seen at each of the second inputs 106 may be the same and/or within a predetermined range of each other.

Impedances of each of the read circuits 82 as seen at each of the first inputs 100 may be matched such that (i) impedances seen at each of the first inputs 100 are a same impedance, and/or (ii) impedances seen at each of the first inputs 100 are within a predetermined range of each other. Impedances of each of the circuits 82, 94 as seen at each of the inputs 100, 106 may be matched such that (i) impedances seen at each of the first inputs 100 are a same impedance seen at each of the second inputs 106, and/or (ii) impedances seen at each of the first inputs 100 are within a predetermined range of the impedances seen at each of the second inputs 106.

The differential amplifiers 90 receive differential input signals from the transmission lines 88, convert the differential input signals to differential output signals Out1-OutN, and output the differential output signals Out1-OutN, as shown. Each of the differential input signals is provided by the transmission line $T_D$ and a respective one of the transmission lines $T_{0-N}$ to a respective one of the differential amplifiers 90. Interference including noise common to both inputs of each of the differential amplifiers 90 may be cancelled by the differential amplifiers 90 to provide common mode noise rejection. Gain of each of the differential amplifiers 68 may be adjusted to increase amplitudes of the differential output signals Out1-OutN and/or to improve corresponding signal-to-noise ratios.

Figure 5:
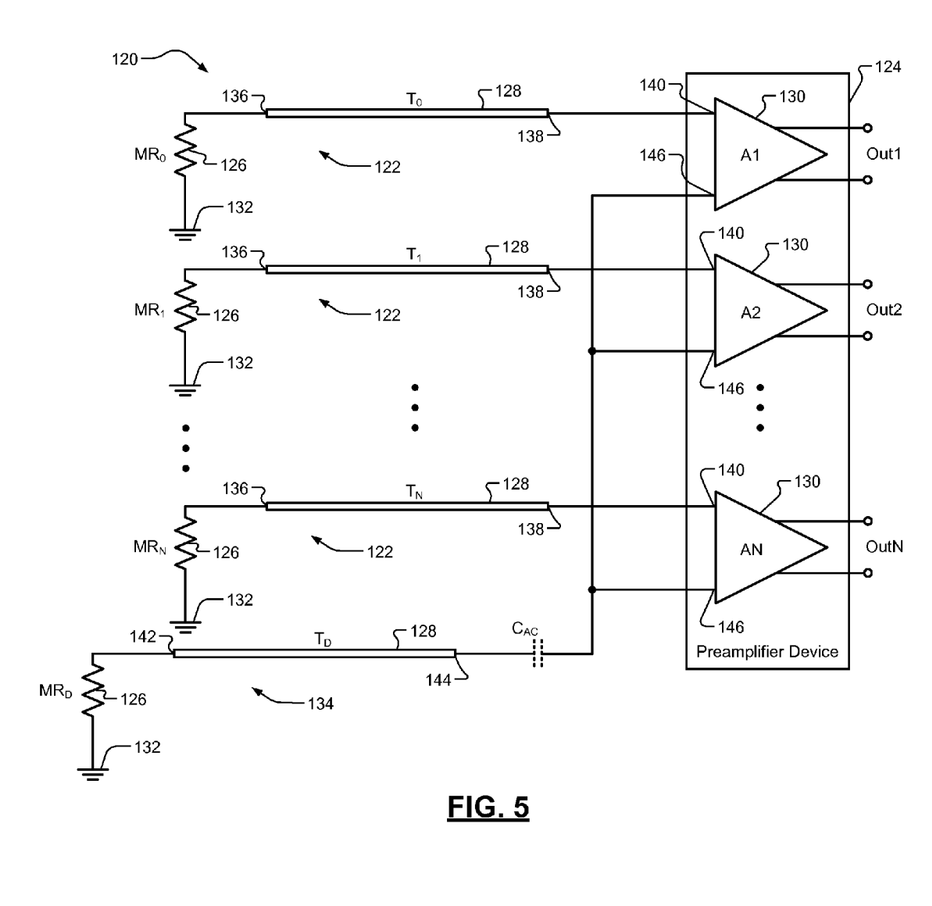
FIG. 5 is a functional block diagram of a pseudo-differential magnetic recording system incorporating direct current (DC) coupling or alternating current (AC) coupling in accordance with an embodiment of the present disclosure.

FIG. 5 shows a pseudo-differential magnetic recording system 120 that may be used in the HDA 12 of FIG. 1. The pseudo-differential magnetic recording system 120 may be a TDMR system and includes read circuits 122 and a preamplifier device 124. The read circuits 122 include read elements 126 and transmission lines 128. The preamplifier device 124 includes differential amplifiers 130. Each of the read elements 126 is connected to a respective one of the differential amplifiers 130 via a respective one of the transmission lines 128. The read elements 126 include active read elements $MR_0$-$MR_N$ and a dummy (or floating) read element $MR_D$. The dummy read element $MR_D$ may have a same resistance and/or impedance as each of the active read elements $MR_0$-$MR_N$. Each of the read elements $MR_0$-$MR_N$ and $MR_D$ may be connected between a ground reference 132 and a respective one of the transmission lines 128.

The transmission lines 128 include transmission lines $T_0$-$T_N$ and a dummy transmission line $T_D$. A dummy circuit 134 includes the dummy read element $MR_D$ and the dummy transmission line $T_D$. First ends 136 of the transmission lines $T_0$-$T_N$ are connected respectively to the read elements $MR_0$-$MR_N$. Second ends 138 of the transmission lines $T_0$-$T_N$ are connected to respective first inputs 140 of the differential amplifiers 130. A first end 142 of the dummy transmission line $T_D$ is connected to the read element $MR_D$. A second end 144 of the dummy transmission line $T_D$ is connected to second inputs 146 of each of the differential amplifiers 130. The dummy transmission line $T_D$ may have a same impedance as each of the transmission lines $T_0$-$T_N$.

A collective impedance of the dummy read element $MR_D$ and the dummy transmission line $T_D$ may be a same impedance as a collective impedance of each of the read elements $MR_0$-$MR_N$ and a corresponding one of the transmission lines $T_0$-$T_N$. Impedances of each of the read circuits 122 as seen at each of the first inputs 140 may be matched such that (i) impedances seen at each of the first inputs 140 are a same impedance, and/or (ii) impedances seen at each of the first inputs 140 are within a predetermined range of each other. Impedances of the dummy circuit 134 as seen at each of the second inputs 146 of the differential amplifiers 130 may be the same and/or within a predetermined range of each other.

The differential amplifiers 130 receive differential input signals from the transmission lines 128, convert the differential input signals to differential output signals Out1-OutN, and output the differential output signals Out1-OutN, as shown. Each of the differential input signals is provided by the transmission line $T_D$ and a respective one of the transmission lines $T_{0-N}$ to a respective one of the differential amplifiers 130. Interference including noise common to both inputs of each of the differential amplifiers 130 may be cancelled by the differential amplifiers 130 to provide common mode noise rejection. Gain of each of the differential amplifiers 130 may be adjusted to increase amplitudes of the differential output signals Out1-OutN and/or to improve corresponding signal-to-noise ratios.

The dummy transmission line $T_D$ may be DC coupled or AC coupled. The DC coupling and the AC coupling may be provided by circuit elements internal to and/or external from the preamplifier device 124 and/or the differential amplifiers 130. In the example shown, the DC coupling and the AC coupling is provided by circuit elements external to the preamplifier device 124 and the differential amplifiers 130. If the dummy transmission line $T_D$ is DC coupled, the second end 144 of the dummy transmission line $T_D$ is connected to the second inputs 146 of the differential amplifiers 130. If the dummy transmission line $T_D$ is AC coupled, a capacitance $C_{AC}$ may be connected between the second end 144 of the dummy transmission line $T_D$ and each of the second inputs 146 of the differential amplifiers 130.

Figure 6:
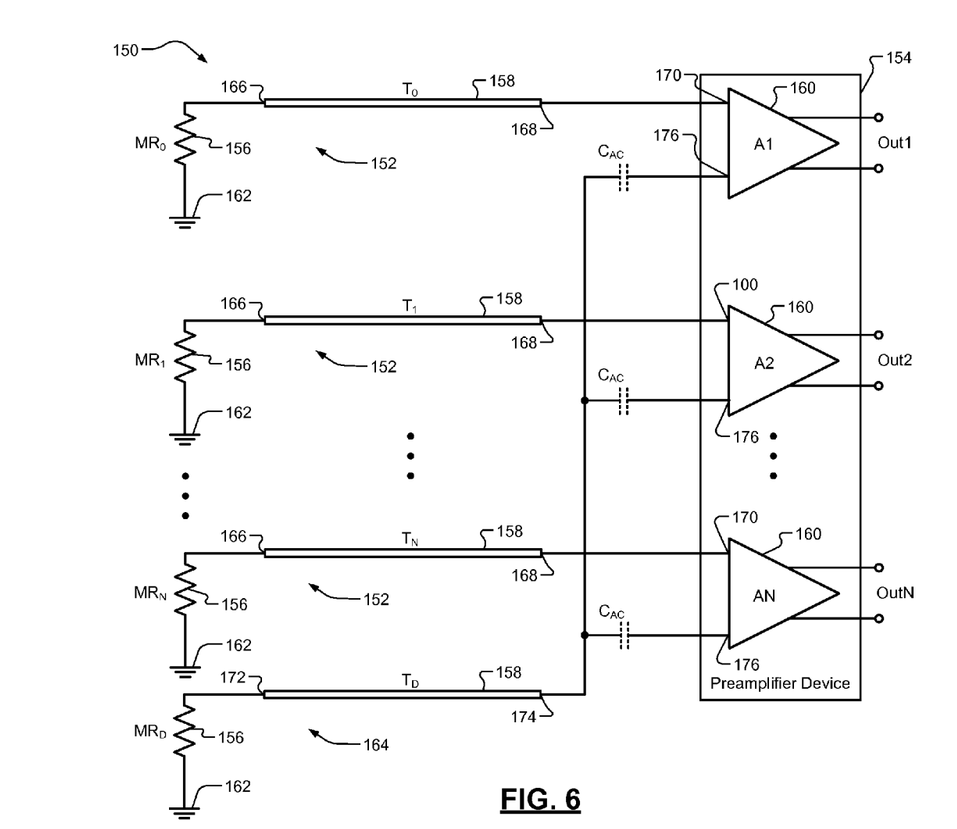
FIG. 6 is a functional block diagram of a pseudo-differential magnetic recording system incorporating DC coupling or AC coupling in accordance with another embodiment of the present disclosure.

FIG. 6 shows a pseudo-differential magnetic recording system 150 that may be used in the HDA 12 of FIG. 1. The pseudo-differential magnetic recording system 150 may be a TDMR system and includes read circuits 152 and a preamplifier device 154. The read circuits 152 include read elements 156 and transmission lines 158. The preamplifier device 154 includes differential amplifiers 160. Each of the read elements 156 is connected to a respective one of the differential amplifiers 160 via a respective one of the transmission lines 158. The read elements 156 include active read elements $MR_0$-$MR_N$ and a dummy (or floating) read element $MR_D$. The read element $MR_D$ may have a same resistance and/or impedance as each of the active read elements $MR_0$-$MR_N$. Each of the read elements $MR_0$-$MR_N$ and $MR_D$ may be connected between a ground reference 162 and a respective one of the transmission lines 158.

The transmission lines 158 include transmission lines $T_0$-$T_N$ and a dummy transmission line $T_D$. A dummy circuit 164 includes the dummy read element $MR_D$ and the dummy transmission line $T_D$. First ends 166 of the transmission lines $T_0$-$T_N$ are connected respectively to the read elements $MR_0$-$MR_N$. Second ends 168 of the transmission lines $T_0$-$T_N$ are connected to respective first inputs 170 of the differential amplifiers 160. A first end 172 of the dummy transmission line $T_D$ is connected to the read element $MR_D$. A second end 174 of the dummy transmission line $T_D$ is connected to second inputs 176 of the differential amplifiers 160.

The dummy transmission line $T_D$ may have a same impedance as each of the transmission lines $T_0$-$T_N$. A collective impedance of the dummy read element $MR_D$ and the dummy transmission line $T_D$ may be a same impedance as a collective impedance of each of the read elements $MR_0$-$MR_N$ and a corresponding one of the transmission lines $T_0$-$T_N$. Impedances of each of the read circuits 152 as seen at each of the first inputs 170 may be matched such that (i) impedances seen at each of the first inputs 170 are a same impedance, and/or (ii) impedances seen at each of the first inputs 170 are within a predetermined range of each other. Impedances of the dummy circuit 164 as seen at each of the second inputs 176 may be the same.

The differential amplifiers 160 receive differential input signals from the transmission lines 158, convert the differential input signals to differential output signals Out1-OutN, and output the differential output signals Out1-OutN, as shown. Each of the differential input signals is provided by the transmission line $T_D$ and a respective one of the transmission lines $T_{0-N}$ to a respective one of the differential amplifiers 160. Interference including noise common to both inputs of each of the differential amplifiers 160 may be cancelled by the differential amplifiers 160 to provide common mode noise rejection. Gain of each of the differential amplifiers 160 may be adjusted to increase amplitudes of the differential output signals Out1-OutN and/or to improve corresponding signal-to-noise ratios.

The dummy transmission line $T_D$ may be DC coupled or AC coupled. The DC coupling and the AC coupling may be provided by circuit elements internal to or external from the preamplifier device 154 and/or the differential amplifiers 160. In the example shown, the DC coupling and the AC coupling is provided by circuit elements external to the preamplifier device 154 and the differential amplifiers 160. If the dummy transmission line $T_D$ is DC coupled, the second end 174 of the dummy transmission line $T_D$ is connected to the second inputs 176 of the differential amplifiers 160. If the dummy transmission line $T_D$ is AC coupled, each of capacitances $C_{AC}$ may be connected between the second end 174 of the dummy transmission line $T_D$ and a respective one of the second inputs 176 of the differential amplifiers 160.

Figure 7:
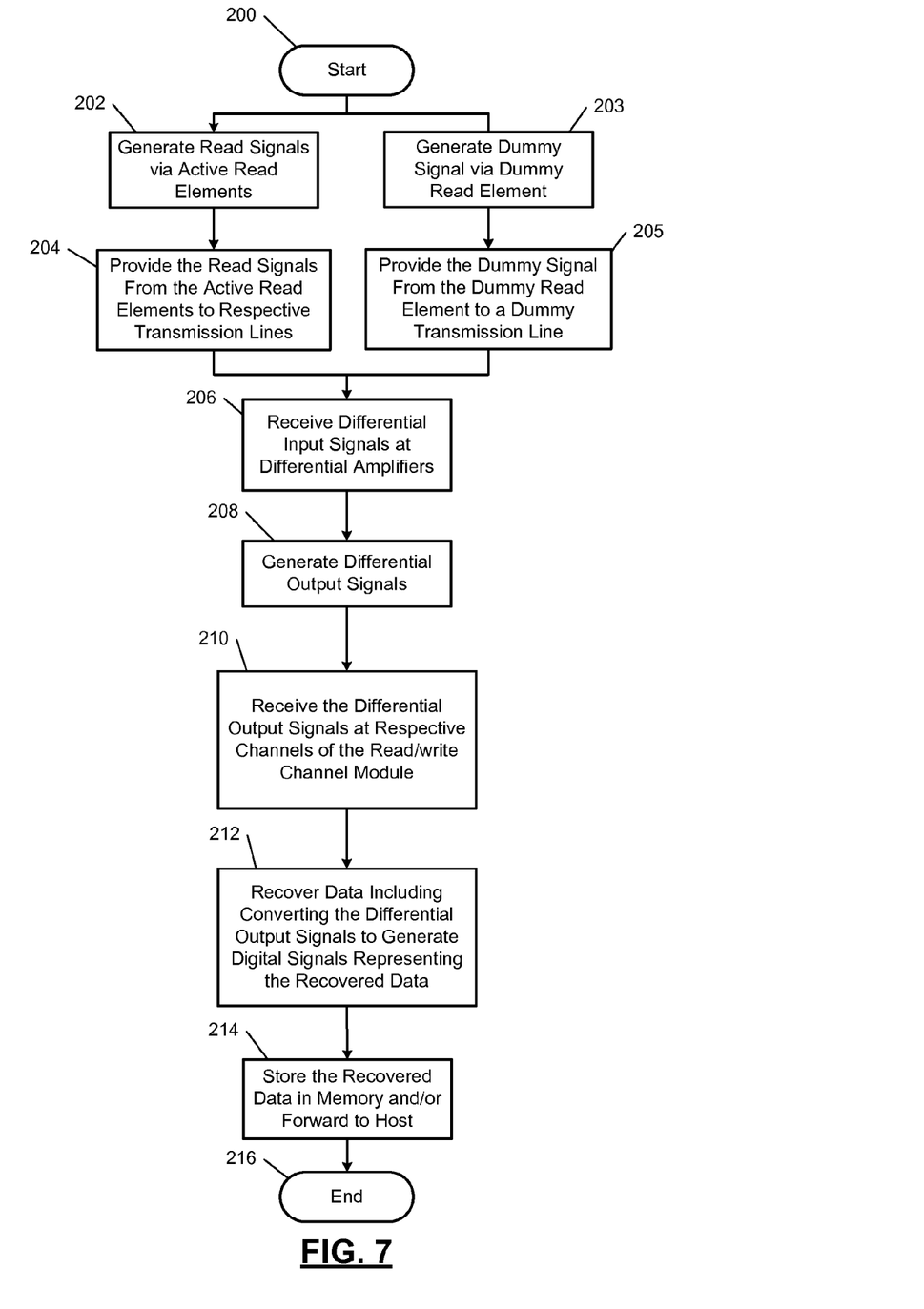
FIG. 7 illustrates a magnetic recording method in accordance with the present disclosure.

The magnetic recording systems (e.g., one of the magnetic recording systems 80, 120, 150) disclosed herein may be operated using numerous methods, an example method is illustrated in FIG. 7. FIG. 7 illustrates a magnetic recording method in accordance with the present disclosure. Although the following tasks are primarily described with respect to the implementations of FIGS. 1 and 4-6, the tasks may be easily modified to apply to other implementations of the present disclosure. The tasks may be iteratively performed.

The magnetic recording method may begin at 200. At 202, read signals and corresponding voltages are generated via active read elements (e.g., read elements $MR_0$-$MR_N$). Each of the active read elements has a respective transmission line (e.g., one of the transmission lines $T_0$-$T_N$) and a respective differential amplifier (one of the differential amplifiers 90, 130, 160). The active read signals may include data and/or information read from a track and may also include interference including noise picked-up by the active read elements.

At 203, a dummy signal (referred to also as an interference signal) is generated via a dummy read element (e.g., the dummy read element $MR_D$). The dummy signal may not include data and/or information read from a track, but rather may include interference including noise picked-up by the dummy read element $MR_D$. Task 203 is performed while task 202 is performed.

At 204, the read signals are provided from the active read elements to respective first inputs of the differential amplifiers via respective transmission lines. At 205, the dummy signal is provided from the dummy read element to the second inputs of the differential amplifiers via the dummy transmission line. The second inputs may be DC coupled or AC coupled as described above. Task 205 is performed while task 204 is performed.

At 206, differential input signals are received at input terminals of the differential amplifiers via the transmission lines. Each of the differential input signals is provided by an output of a respective one of the transmission lines and an output of the dummy transmission line. Each of the differential input signals is thus based on a respective one of the read signals and the dummy signal. The dummy signal is received at the second inputs of the differential amplifiers while the read signals are received at the first input of the differential amplifiers. At 208, the differential input signals are converted as described above to generate differential output voltages. The differential input signals are amplified via the differential amplifiers to generate the differential output signals. Interference including noise contained in the read signals and the dummy signal is cancelled and/or minimized by the differential amplifiers to provide the differential output signals with minimal noise. Interference including noise that is common to both inputs of each of the differential amplifiers is cancelled.

At 210, the differential output signals are received at respective read/write channels of a read/write channel module (e.g., read-channel module 28). At 212, the read/write channel module may include an analog-to-digital (A/D) converter and convert the differential output voltages, which are provided as analog signals, into digital signals. The read/write channel module may decode the digital signals to recover original data. This may include error correction code (ECC) decoding and/or run-length-limited (RLL) decoding.

At 214, a HDC module (e.g., the HDC module 30) stores the data in memory (e.g., one of the memories 36, 38) and/or provides the data to a host via an interface (e.g., the interface 40). The method may end at 216.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

In the foregoing description, various terms are used to describe the physical relationship between circuit elements. When a first element is referred to as being "engaged to", "connected to", or "coupled to" a second element, the first element may be directly engaged, connected, disposed, applied, or coupled to the second element, or intervening elements may be present. In contrast, when an element is referred to as being "directly engaged to", "directly connected to", or "directly coupled to" another element, there may be no intervening elements present. Other words used to describe the relationship between elements should be interpreted in a like fashion (e.g., "between" versus "directly between", "adjacent" versus "directly adjacent", etc.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:
1. A system comprising:
a first transmission line;
a second transmission line;
a first element configured to read a storage media to generate a read signal, wherein the first element is connected to the first transmission line;

a second element configured to detect interference and generate an interference signal, wherein the second element is connected to the second transmission line; and a differential amplifier comprising a first input and a second input, wherein the first input of the differential amplifier is connected to a the first transmission line and receives the read signal, and wherein the second input of the differential amplifier is connected to the second transmission line and receives the interference signal.

2. The system of claim 1, wherein the second element is not configured to read data or information from a track.

3. The system of claim 1, comprising:
a plurality of transmission lines comprising the first transmission line and not the second transmission line, wherein the read signal is a first read signal;
a plurality of elements comprising the first element, wherein the plurality of elements are configured to read one or more tracks on the storage media to generate a plurality of read signals, wherein the plurality of read signals include the first read signal, and wherein each of the plurality of elements is connected to a respective one of the plurality of transmission lines,
wherein the differential amplifier is a first differential amplifier; and
a plurality of differential amplifiers comprising the first differential amplifier, wherein the plurality of differential amplifiers are connected respectively to the plurality of elements via the plurality of transmission lines, wherein the plurality of differential amplifiers comprise respective first inputs and respective second inputs, wherein each of the first inputs of the plurality of differential amplifiers is connected to a respective one of the plurality of transmission lines and receives a respective one of the plurality of read signals, and wherein each of the second inputs of the plurality of differential amplifiers is connected to the second transmission line and receives the interference signal.

4. The system of claim 3, wherein:
the plurality of differential amplifiers are configured to amplify differential input signals; and
each of the differential input signals is based on one of the plurality of read signals and the interference signal.

5. The system of claim 4, wherein each of the differential input signals is received from an output of one of the plurality of transmission lines and an output of the second transmission line.

6. The system of claim 3, wherein:
a number of the plurality of transmission lines is equal to a number of the plurality of elements;
the number of the plurality of elements is equal to a number of the plurality of differential amplifiers; and
the number of the plurality of transmission lines is equal to the number of the plurality of differential amplifiers.

7. The system of claim 3, wherein a total number of transmission lines connected to the first inputs and the second inputs of the plurality of differential amplifiers is equal to:
one more than a number of the plurality of elements; and
one more than a total number of the first inputs of the differential amplifiers.

8. The system of claim 3, wherein:
the plurality of transmission lines comprises the first transmission line and a third transmission line;
the plurality of elements comprise the first element and a third element;
the plurality of differential amplifiers comprise the first differential amplifier and a second differential amplifier;

the first element is connected between a ground reference and the first transmission line;
the second element is connected between the ground reference and the second transmission line;
the third element is connected between the ground reference and the third transmission line;
the first transmission line is connected between the first element and the first input of the first differential amplifier;
the second transmission line is connected between the second element and each of the second inputs of the plurality of differential amplifiers; and
the third transmission line is connected between the third element and the first input of the second differential amplifier.

9. The system of claim 3, wherein each of the second inputs of the plurality of differential amplifiers is direct current (DC) coupled or alternating current (AC) coupled.

10. The system of claim 3, further comprising a capacitance connected in series with the second transmission line and between the second transmission line and the second inputs of the plurality of differential amplifiers.

11. The system of claim 3, further comprising a capacitance connected between the second transmission line and the second inputs of the plurality of differential amplifiers.

12. The system of claim 3, further comprising:
a device comprising the plurality of differential amplifiers;
a plurality of heads disposed over a same surface of the storage media, wherein each of the plurality of heads comprises a respective one of the plurality of elements; and
an assembly comprising the plurality of transmission lines and the second transmission line, wherein the assembly suspends the plurality of transmission lines and the second transmission line over a portion of the storage media between the device and the plurality of heads.

13. A system comprising:
a plurality of transmission lines;
a plurality of elements configured to read one or more tracks on a storage media to generate read signals, wherein each of the plurality of elements is connected to a respective one of the plurality of transmission lines;
a second element configured to detect interference and generate an interference signal, wherein the second element is connected to a dummy transmission line; and
a plurality of differential amplifiers connected respectively to the plurality of elements via the plurality of transmission lines, wherein each of the plurality of differential amplifiers comprises a first input and a second input, wherein each of the first inputs of the plurality of differential amplifiers is connected to a respective one of the plurality of transmission lines and receives a respective one of the read signals, and wherein each of the second inputs of the plurality of differential amplifiers is connected to the dummy transmission line and receives the interference signal.

14. A method comprising:
reading a track on a disk to generate a read signal via a first element, wherein the first element is connected to a first transmission line;
detecting interference and generating an interference signal via a second element, wherein the second element is connected to a second transmission line;
receiving the read signal at a first input of a differential amplifier; and
receiving the interference signal at a second input of the differential amplifier, wherein the first input of the differential amplifier is connected to the first transmission line, and wherein the second input of the differential amplifier is connected to the second transmission line.

15. The method of claim 14, wherein:

a plurality of transmission lines comprise the first transmission line and not the second transmission line;

the track is a first track;

the read signal is a first read signal; and the differential amplifier is a first differential amplifier.

16. The method of claim 15, comprising:

reading one or more tracks on the disk to generate a plurality of read signals via a plurality of elements, wherein the plurality of read signals comprise the first read signal, wherein the plurality of elements comprise the first element, and wherein each of the plurality of elements is connected to a respective one of the plurality of transmission lines;

receiving the plurality of read signals respectively at a plurality of differential amplifiers, wherein the plurality of differential amplifiers comprise the first differential amplifier and are connected respectively to the plurality of elements via the plurality of transmission lines, wherein the plurality of differential amplifiers comprise respective first inputs and respective second inputs, and wherein the first inputs receive respectively the plurality of read signals; and receiving the interference signal at each of the second inputs of the plurality of differential amplifiers, wherein each of the second inputs is connected to the second transmission line.

17. The method of claim 16, further comprising:

receiving each of a plurality of differential input signals from an output of the second transmission line and an output of one of the plurality of transmission lines; and amplifying the plurality of differential input signals via the plurality of differential amplifiers, wherein each of the differential input signals is based on one of the plurality of read signals and the interference signal.

18. The method of claim 16, wherein:

a number of the plurality of transmission lines is equal to a number of the plurality of elements;

a number of the plurality of elements is equal to a number of the plurality of differential amplifiers; and a number of the plurality of transmission lines is equal to a number of the plurality of differential amplifiers.

19. The method of claim 16, further comprising direct current (DC) coupling or alternating current (AC) coupling each of the second inputs of the plurality of differential amplifiers.

20. The method of claim 16, further comprising suspending the plurality of transmission lines and the second transmission line over a portion of the disk between the plurality of differential amplifiers and a plurality of heads, wherein the plurality of heads are disposed on a same surface of the disk, wherein each of the plurality of heads comprises a respective one of the plurality of elements.

* * * * *